April 9, 1968 K. RAITHEL 3,377,216

METHOD FOR INDIFFUSION OF FOREIGN MATERIAL INTO A MONOCRYSTALLINE SEMICONDUCTOR MEMBER

Filed June 21, 1965

United States Patent Office 3,377,216

Patented Apr. 9, 1968

3,377,216
METHOD FOR INDIFFUSION OF FOREIGN MATERIAL INTO A MONOCRYSTALLINE SEMICONDUCTOR MEMBER

Kurt Raithel, Uttenreuth, Germany, assignor to Siemens Aktiengesellschaft, Berlin, Germany, a corporation of Germany Filed June 21, 1965, Ser. No. 465,504
Claims priority, application Germany, June 20, 1964, S 91,637
4 Claims. (Cl. 148—189)

ABSTRACT OF THE DISCLOSURE

Method of indiffusing active impurity, such as donor impurity, acceptor impurity and impurity forming recombination centers, into a crystalline semiconductor member includes heating a closed ampule containing a semiconductor member and two sources of active impurity, spaced from the semiconductor member and from one another, to a temperature at which the semiconductor member is indiffused by active impurity from the sources thereof; melting the material of the ampule at a location intermediate the semiconductor member and one of the active impurity sources so as to divide the interior of the ampule into two sealed chambers one of which containing the one active impurity source and the other of which containing both the semiconductor member and the other active impurity source; and heating the ampule to a temperature at which the semiconductor member is further indiffused by active impurity only from the other active impurity source.

Figure 1:
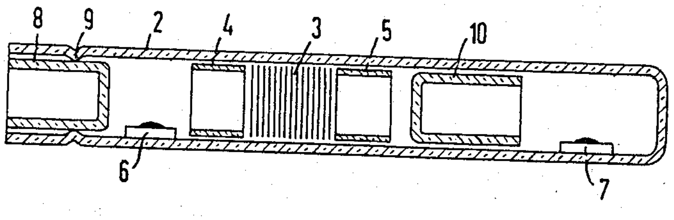

My invention relates to a method for indiffusion of foreign substances, especially dopant material, into a monocrystalline semiconductor member. The foreign substances referred to herein are limited to so-called active impurities, constituting impurities that affect the electrical characteristics of the semiconductor member, such as donor impurities, acceptor impurities and impurities forming recombination centers.

Methods of this general type are used in semiconductor technology, for example, in order to dope parts of the semiconductor member. Furthermore, foreign substances can be introduced into the semiconductor member in this manner so as to perform other functions there than those of a dopant, for example to diminish the life span of minority carriers in the semiconductor material which can, for example, shorten the switching periods in the case of controlled semiconductor components.

With diffusion processes of this type, it is known to enclose the semiconductor member together with a source of the foreign substance in a quartz ampule and then to effect the indiffusion of the foreign material into the semiconductor body by heating the ampule. The temperature at which the process is carried out and the duration of the process determine the vapor pressure, the surface concentration and the depth of penetration of the foreign substance. The source of the foreign substance is located in the ampule isolated from the semiconductor member. It can consist, for example, of a piece of the same semiconductor material contaminated with the foreign substance, but it can also constitute a piece of the foreign substance proper. In various cases, foreign material sources consisting of a disc of the semiconductor material to which the foreign material has been alloyed were found to be suitable. Preferably, in such processes, not only is a single semiconductor member treated, but rather, several semiconductor members, which are enclosed together with the foreign material source in the ampule. For example, the source of the foreign substance and the semiconductor member or members can be placed in a quartz ampule, and the ampule can then be evacuated, whereupon the ampule can be sealed by being fused with the aid of a tube length of U-shaped cross section that is inserted into the ampule. The ampule is then placed in a furnace and is heated there in the desired manner.

According to an earlier proposal, in a method for producing semiconductor components, there are indiffused at least two impurities causing the occurrence of opposite conductance types respectively. A result thereof is that one impurity determines the surface concentration, whereas the other impurity determines the depth of penetration. By the selection of appropriate impurities, a desired diffusion profile can be adjusted in this manner. According to the prior proposal, both impurities can be combined in one diffusion source or they can be diffused either simultaneously or successively into the semiconductor member from two different foreign material sources.

It is accordingly an object of my invention to provide a method of diffusing into a semiconductor member two active impurities, for example two dopant materials, or one dopant material and one material affecting the service life of the member, which avoids the disadvantages of the heretofore proposed methods. More particularly it is an object of my invention to avoid the slight possibility of an influence being exerted at the simultaneous indiffusion of both foreign substances as in the known method and to avoid the complex steps of the known method wherein the indiffusion of both foreign materials takes place in separate processes.

With the foregoing and other objects in view, I provide, in accordance with my invention, a method of indiffusing active impurities, especially dopant materials, into a monocrystalline semiconductor member, which comprises heating the semiconductor member and two sources respectively of active impurity in the inner space of a closed and, if necessary, evacuated ampule. After a predetermined period during which the semiconductor member and the sources of active impurity are heated, I divide the inner space of the ampule, in accordance with a feature of my invention, into two chambers by fusing the material of the ampule so that one of the active impurity sources is located in one chamber, and the semiconductor member and the other active impurity source are located in the other chamber. The ampule is then heated again. In accordance with a further feature of my invention a third chamber in which the second active impurity source is located can be formed by fusion so that the semiconductor member and each of the active impurity sources are thus isolated from each other and the ampule is again heated.

The features which are considered as characteristic for the invention are set forth in the appended claims.

While the invention has been illustrated and described as method for indiffusion of foreign material into a monocrystalline semiconductor member, it is not intended to be limited to the details shown, since various modifications may be made therein without departing from the spirit of the invention and within the scope and range of equivalents of the claims appended hereto.

The invention, together with additional objects and advantages thereof, will be best understood from the following description when read in connection with the accompanying drawings, in which:

FIG. 1 is a longitudinal sectional view of an ampule containing suitable components for carrying out the method according to the invention.

Figure 2:
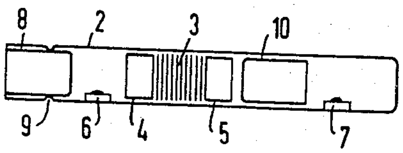
Figure 3:
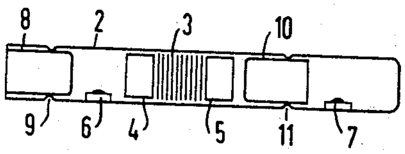
Figure 4:
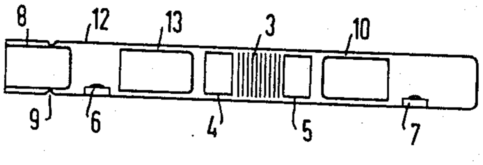

FIGS. 2, 3, and 4 are schematic views of FIG. 1 showing the ampule in reduced size and at various phases of the method.

Referring now to the drawing and first, particularly to FIG. 1 there is shown in section an ampule 2, of quartz, for example. A number of semiconductor discs 3 consisting of silicon, for example, are located in the ampule and are supported between two tubular sections 4 and 5, which serve as holders, much like a pair of hollow bookends. These holders 4, 5 can also be made of quartz. At one end of the ampule 2 there is located a source 6 of one active impurity and at the other end of the ampule there is located a source 7 of the other active impurity. The active impurity source 6 can, for example, be a silicon disc to the surface of which an aluminum drop has been alloyed. Source 7 can also, for example, comprise a piece of silicon, having a small recess (not shown) at its upper surface in which a drop of gallium is contained. The ampule 2 is closed on one side by a tube length 8 having a U-shaped cross section. The tube length 8 is pushed into the open end of the ampule 2 and is sealed by melting at the annular location 9 to the wall of the ampule 2. A second tube length 10 with a U-shaped cross section is shoved into the ampule 2 so that it is located between the gallium source 7 and the semiconductor discs 3.

FIG. 2 is a schematic view of FIG. 1 in reduced size and shows the same phase of the method of the invention as shown in FIG. 1. In FIG. 3, the ampule 2 is shown after sealing of the tube length 10 to the wall of the ampule 2 by fusion. The sealing at the annular location 11 divides the ampule 2 into two chambers so that the gallium source 7 is cut off from the remaining portion of the ampule in which the silicon discs 3 and source 6 are contained so that, during subsequent heating, no gallium vapors from the source 7 can reach the semiconductor discs 3.

FIG. 4 shows a slightly modified ampule 12, which, like the ampule 2 of FIGS. 1 to 3, also contains semiconductor discs 3, holders 4 and 5, a source 6 of one active impurity and a source 7 of another active impurity, as well as a tube length 8 with which the ampule 12 is sealed by fusion along an annular location 9. However, in this case, an additional tube length 13 with a U-shaped cross section is inserted between the holder 4 and the source 6 into the ampule 12, in addition to the tube length 10 inserted between the holder 5 and the source 7. This affords the possibility of separating either one or the other active impurity source or both active impurity sources simultaneously or successively, from the semiconductor discs 3 by suitably fusing one or the other or both, as the case may be, of the tube lengths 10, 13 at a peripheral location thereof to the wall of the ampule 12.

Consequently, with the device according to FIG. 4, it is possible to carry out a method, in which, initially, active impurity is diffused into the semiconductor discs from both active impurity sources and in which, thereafter, additional indiffusion takes place only from one active impurity source and, in which, finally, the one active impurity source is isolated, whereupon, a further indiffusion of the active impurity that has already penetrated into a surface layer of the semiconductor can be carried out.

Prior to beginning the diffusion step, the ampule can be pre-cleaned, for example by being filled with aqua regia and left standing therewith for several hours, such as 16 hours, for example. The ampule is then rinsed with a treatment liquid consisting of 10 parts of 40% hydrofluoric acid, 10 parts of fuming nitric acid and 80 parts of distilled water. The quartz ampule is thereafter dried in an oven. The sealing portion of the ampule and the tube lengths are treated in the same or similar manner.

After the introduction of a foreign substance source, for example consisting of a gallium source comprising a piece of silicon with a drop of gallium, the ampule is evacuated and, while the vacuum pump is running, is heated for about one hour at 1,000° C. Presumably, undesirable foreign materials and oxides, as for example gallium suboxide, are thereby vaporized. Thereafter, the tube lengths and the semiconductor discs, as well as a second active impurity source, are introduced. A further precleaning is then performed, for example, when the second source is an aluminum source, by heating to approximately 700° C. while the vacuum pump remains in operation. Finally, the sealing tubular member 8 is inserted and the quartz ampule is sealed thereto by melting. The melting of the quartz to seal the ampule is effected with the aid of a hydrogen flame, which can produce local heating up to 2000° C. This is harmless, however, since it is limited to a locality and is, also, of short duration. After the ampule is pre-cleaned, filled and sealed, it is heated for a period of about 10 minutes to 3 hours, for example 1 hour, at a temperature of 1100° to 1250° C., for example. As a consequence thereof both aluminum and gallium are diffused into the semiconductor discs, for example silicon discs of n-conductance type. After the ampule has cooled, the gallium source 7 is isolated from the remaining space of the ampule by fusing the ampule to the tubular part 10 so as to seal off a chamber within which the gallium source 7 is located. Thereafter, the ampule is again placed in a furnace and reheated at a temperature of about 1200 to 1250° C. for approximately 15 to 72 hours, for example at a temperature of 1230° C. for about 30 hours. During this second heating step, only aluminum is supplied to the semiconductor discs, while the aluminum and gallium that had already penetrated into the semiconductor material during the previous heating step, advance deeper into the semiconductor discs and thereby produce a p-conducting zone surrounding each of the semiconductor discs entirely.

The method of my invention may find use in the production of semiconductor members, which will be further processed into various semiconductor components, such as rectifiers, transistors, or photosemiconductor devices, for example. It is especially useful in the production of semiconductor thyristors of the pnpn type. Such semiconductor thyristors have so far been produced by diffusing a p-conducting material from all sides into an n-conducting semiconductor member, and thereafter subdividing into several zones, for example by a mechanical process, the p-conducting surface layer produced thereby. Finally, an n-conducting material is applied, by alloying, for example into one of the thus produced p-conducting zones, so that an n-conducting zone is additionally formed in this p-conducting zone. The method of this invention can be applied to the foregoing known method for producing the surrounding p-conducting zone, since in this manner the parameters of this zone, as for example the depth of penetration, surface concentration and gradient of the doping concentration, can be selected quite freely within wide limits.

I claim:

1. Method of indiffusing active impurity, such as donor impurity, acceptor impurity and impurity forming recombination centers, into a crystalline semiconductor member which comprises heating a closed ampule containing a semiconductor member and two sources of active impurity, spaced from the semiconductor member and from one another, to a temperature at which the semiconductor member is indiffused by active impurity from the sources thereof; melting the material of the ampule at a location intermediate the semiconductor member and one of the active impurity sources so as to divide the interior of the ampule into two sealed chambers one of which containing the one active impurity source and the other of which containing both the semiconductor member and the other active impurity source; and heating the ampule to a temperature at which the semiconductor member is further indiffused by active impurity only from the other active impurity source.

2. Method of indiffusing active impurity, such as donor impurity, acceptor impurity and impurity forming recombination centers, into a crystalline semiconductor member which comprises heating a closed ampule containing a semiconductor member and two sources of active impurity, spaced from the semiconductor member and from one another, to a temperature at which the semiconductor member is indiffused by active impurity from the sources thereof; melting the material of the ampule at a location intermediate the semiconductor member and one of the active impurity sources so as to divide the interior of the ampule into two sealed chambers one of which containing the one active impurity source and the other of which containing both the semiconductor member and the other active impurity source; heating the ampule to a temperature at which the semiconductor member is further indiffused by active impurity only from the other active impurity source; melting the material of the ampule at a location intermediate the semiconductor member and the other active impurity source so as to divide the chamber containing the semiconductor member and the other active impurity source into two sealed subchambers one of which containing the semiconductor member and the other of which containing the other active impurity source; and heating the ampule to a temperature at which the active impurity previously indiffused into the semiconductor member penetrates further into the semiconductor member.

3. Method of indiffusing foreign substances into a monocrystalline semiconductor member which comprises heating a closed ampule containing a gallium source, an aluminum source and a semiconductor member, spaced from one another, for substantially 10 minutes to three hours at a temperature of substantially 1100 to 1300° C. whereby the semiconductor member is indiffused by gallium and aluminum from the respective sources thereof; melting the material of the ampule at a location intermediate the semiconductor member and the gallium source so as to divide the interior of the ampule into one sealed chamber containing the gallium source and another sealed chamber containing both the semiconductor member and the aluminum source; and heating the ampule for substantially 15 to 72 hours at a temperature of substantially 1200 to 1250° C. whereby the semiconductor member is indiffused only by aluminum.

4. Method of indiffusing foreign substances into a monocrystalline semiconductor member which comprises heating a closed quartz ampule containing a gallium source, an aluminum source and a semiconductor member, each spaced from one another, substantially for one hour at a temperature of 1230° C. whereby the semiconductor member is indiffused by gallium and aluminum from the respective sources thereof; melting the quartz ampule at a location thereof intermediate the semiconductor member and the gallium source so as to divide the interior of the ampule into one sealed chamber containing the gallium source and another sealed chamber containing both the semiconductor member and the aluminum source; and heating the ampule substantially for 30 hours at a temperature of 1230° C. whereby the semiconductor member is indiffused by aluminum only.

References Cited

UNITED STATES PATENTS

| | | | |
|---|---|---|---|
| 3,003,900 | 10/1961 | Levi | 148—189 |
| 3,145,125 | 8/1964 | Lyons | 148—175 |
| 3,154,450 | 10/1964 | Hoeckelman | 148—189 |
| 3,178,798 | 4/1965 | Marinace | 148—175 |

HYLAND BIZOT, *Primary Examiner.*